(12) United States Patent
Wang et al.

(10) Patent No.: US 9,041,890 B2
(45) Date of Patent: May 26, 2015

(54) PIXEL STRUCTURE, ARRAY SUBSTRATE, AND LIQUID CRYSTAL DISPLAY PANEL

(71) Applicant: BOE TECHNOLOGY GROUP CO., LTD., Beijing (CN)

(72) Inventors: Qiangtao Wang, Beijing (CN); Xinli Ma, Beijing (CN); Haiyan Wang, Beijing (CN); Zheng Fang, Beijing (CN); Yunyun Tian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/104,066

(22) Filed: Dec. 12, 2013

(65) Prior Publication Data

US 2014/0168593 A1    Jun. 19, 2014

(30) Foreign Application Priority Data

Dec. 14, 2012  (CN) .......................... 2012 1 0546672

(51) Int. Cl.
*G02F 1/1343* (2006.01)
*G02F 1/1337* (2006.01)

(52) U.S. Cl.
CPC .... *G02F 1/134309* (2013.01); *G02F 1/133707* (2013.01); *G02F 1/134363* (2013.01); *G02F 2001/133757* (2013.01); *G02F 2001/134345* (2013.01)

(58) Field of Classification Search
USPC ......................................................... 349/141
See application file for complete search history.

(56) References Cited

U.S. PATENT DOCUMENTS

2009/0046233 A1*  2/2009  Cho et al. ...................... 349/141

FOREIGN PATENT DOCUMENTS

CN            202049313 U     11/2011

OTHER PUBLICATIONS

First Chinese Office Action Appln. No. 201210546672.3; Dated Sep. 22, 2014.
Extended European Search Report Dated Jan. 29, 2014 Appln. No. EP 13 19 6452.
Second Chinese Office Action dated Dec. 11, 2014; Appln. No. 201210546672.3.

* cited by examiner

*Primary Examiner* — Lucy Chien
(74) *Attorney, Agent, or Firm* — Ladas & Parry LLP (57) ABSTRACT

A pixel structure comprises a plurality of pixel regions, and each of the pixel regions includes first and second electrodes that are overlapped with each other, the first electrode is disposed above the second electrode, and each of the pixel regions is divided at least into a first to fourth domain display regions; strip-shaped first electrodes in the first to fourth domain display regions make first to fourth angles with a reference direction; the sum of the first angle and the second angle is 180 degrees, the sum of the third angle and the fourth angle is 180 degrees, and the first, the second, the third and the fourth angles are different from one another.

11 Claims, 8 Drawing Sheets

PIXEL STRUCTURE, ARRAY SUBSTRATE, AND LIQUID CRYSTAL DISPLAY PANEL

TECHNICAL FIELD

Embodiments of the present technical disclosure relate to a pixel structure, a TFT array substrate, a liquid crystal display panel and a driving method.

BACKGROUND

Along with the development of the Thin Film Transistor Liquid Crystal Displays (TFT-LCDs) and the advancement of industrial technology, the manufacturing costs for the liquid crystal display devices are reduced while the manufacturing process has been gradually improved, and the TFT-LCDs have now taken the place of cathode ray tube and dominated the field of display in the daily life.

Figure 1:
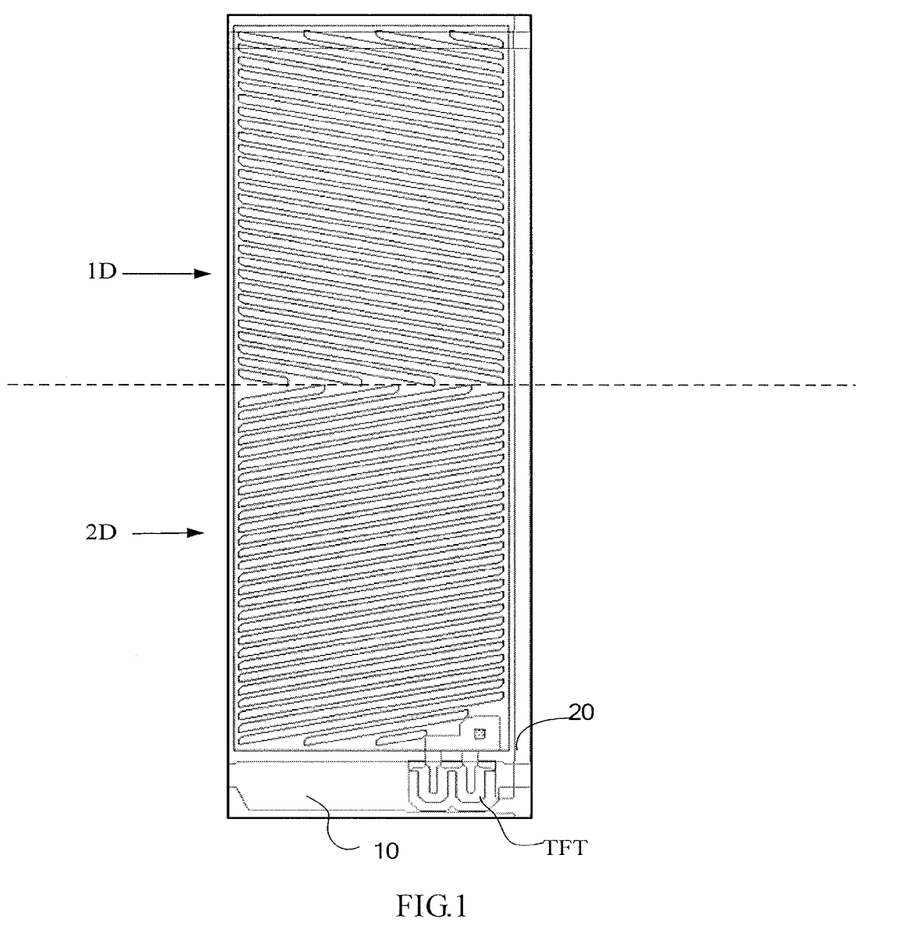
FIG. 1 is a structural schematic view of a pixel structure of a traditional double-domain display region.

With such characteristics as high transmittance, wide viewing angle, and low costs, Advanced Super Dimension Switch (ADSDS) technology has become one of the important technologies in the current field of highly advanced display. FIG. 1 shows a structure of a pixel region in a pixel structure of a double-domain ADSDS liquid crystal display technology, which pixel region is defined by adjacent gate lines and data lines and comprises two domains of display regions having the same area. The technology has been widely applied to high-end mobile phone screens, portable application products, monitor, television panels and etc. Further improvements to the technology include how to further reduce chromatic aberration, how to enlarge the viewing angle, and etc.

SUMMARY

Embodiments of the present technical disclosure provide a pixel structure, a TFT array substrate, a liquid crystal display panel and a driving method, which may reduce chromatic aberration of liquid crystal display and improve the imaging quality.

One embodiment of the present technical disclosure provides a pixel structure, comprising a plurality of pixel regions, wherein each of the pixel regions includes a first electrode and a second electrode that are overlapped with each other, the first electrode is disposed above the second electrode, and each of the pixel regions is divided at least into: a first domain display region, a second domain display region, a third domain display region, and a fourth domain display region; a strip-shaped first electrode in the first domain display region forms a first angle with a reference direction, a strip-shaped first electrode in the second domain display region forms a second angle with the reference direction, a strip-shaped first electrode in the third domain display region forms a third angle with the reference direction, a strip-shaped first electrode in the fourth domain display region forms a fourth angle with the reference direction; the sum of the first angle and the second angle is 180 degrees, the sum of the third angle and the fourth angle is 180 degrees, and the first, the second, the third and the fourth angles are different from one another.

A further embodiment of the present technical disclosure provides an array substrate, which comprises the aforementioned pixel structure.

A further embodiment of the present technical disclosure provides a liquid crystal display panel, comprising an aforementioned array substrate, a color filter substrate and liquid crystal materials.

A further embodiment of the present technical disclosure provides a method of driving said array substrate, comprising: a first or a second electrode in the first domain display region, the second domain display region, the third domain display region, and the fourth domain display region being controlled by driving signals received by the same TFT.

On the basis of the double-domain ADSDS liquid display technology, the embodiments of the present technical disclosure reduce the chromatic aberration of display and improve the quality of liquid crystal display by providing two additional display pixel regions.

Further scope of applicability of the present technical disclosure will become apparent from the detailed description given hereinafter. However, it should be understood that the detailed description and specific examples, while indicating preferred embodiments of the technical disclosure, are given by way of illustration only, since various changes and modifications within the spirit and scope of the technical disclosure will become apparent to those skilled in the art from the following detailed description.

BRIEF DESCRIPTION OF THE DRAWINGS

In order to clearly illustrate the technical solution of the embodiments of the technical disclosure, the drawings of the embodiments will be briefly described in the following; it is obvious that the described drawings are only related to some embodiments of the technical disclosure and thus are not limitative of the technical disclosure.

FIG. 2 (a) is a structural schematic view of a pixel structure provided in an embodiment of the present technical disclosure;

FIG. 2 (b) is a structural schematic view of another pixel structure provided in an embodiment of the present technical disclosure;

FIG. 5 (a) is a rotational schematic view of liquid crystal molecules in region 1D in FIG. 2 (a);

FIG. 5 (b) is a rotational schematic view of liquid crystal molecules in region 2D in FIG. 2 (a);

FIG. 5 (c) is a rotational schematic view of liquid crystal molecules in region 3D in FIG. 2 (a);

FIG. 5 (d) is a rotational schematic view of liquid crystal molecules in region 4D in FIG. 2 (a);

DETAILED DESCRIPTION

In order to make objects, technical details and advantages of the embodiments of the technical disclosure apparent, the technical solutions of the embodiments will be described in a clearly and fully understandable way in connection with the drawings related to the embodiments of the technical disclosure. Apparently, the described embodiments are just a part but not all of the embodiments of the technical disclosure. Based on the described embodiments herein, those skilled in the art can obtain other embodiment(s), without any inventive work, which should be within the scope of the technical disclosure.

One embodiment of the present technical disclosure provides a pixel structure, a thin film transistor (TFT) array substrate, a liquid crystal display panel and a method of driving the array substrate, which may reduce chromatic aberration of liquid crystal display and improve the imaging quality.

Figure 2A:
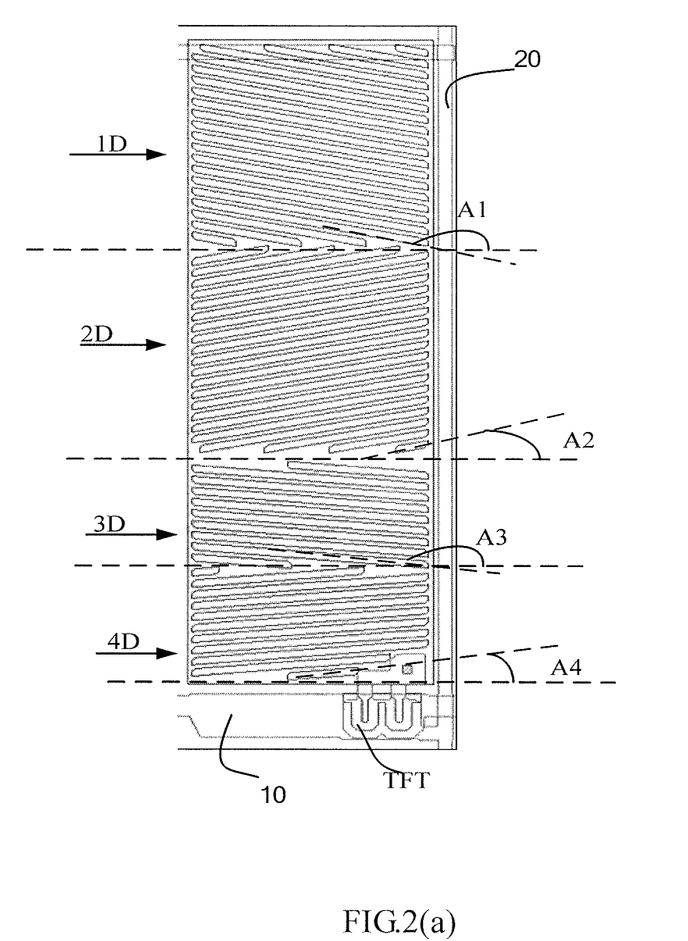

Referring to FIG. 2 (a), the present embodiment provides a pixel structure, comprising a plurality of pixel regions, e.g., arranged in an array. Each of the pixel regions includes a pixel electrode and a common electrode, the pixel electrode is disposed above the common electrode, and each of the pixel regions is divided into: a first domain display region 1D, a second domain display region 2D, a third domain display region 3D, and a fourth domain display region 4D.

A strip-shaped pixel electrode in the first domain display region 1D forms a first angle A1 with a reference direction, a strip-shaped pixel electrode in the second domain display region 2D forms a second angle A2 with the reference direction, a strip-shaped pixel electrode in the third domain display region 3D forms a third angle A3 with the reference direction, and a strip-shaped pixel electrode in the fourth domain display region 4D forms a fourth angle A4 with the reference direction.

The sum of the first angle A1 and the second angle A2 is 180 degrees, the sum of the third angle A3 and the fourth angle A4 is 180 degrees, and the first angle A1, the second angle A2, the third angle A3 and the fourth angle A4 are different from one another. The reference direction refers to an initially aligned direction of the liquid crystal molecules when no liquid crystal driving electrical field is formed. Herein, the horizontal-right direction in the drawings is the reference direction such that the liquid crystal molecules in the first domain display region 1D and the liquid crystal molecules in the second domain display region 2D are symmetrical, and the liquid crystal molecules in the third domain display region 3D and the liquid crystal molecules in the fourth domain display region 4D are symmetrical.

For example, preferably, the first angle A1 is greater than zero degree and less than or equal to 11 degrees, or is greater than or equal to 169 degrees and less than 180 degrees.

For example, preferably, the third angle A3 is greater than zero degree and less than or equal to 11 degrees, or is greater than or equal to 169 degrees and less than 180 degrees.

Figure 2B:
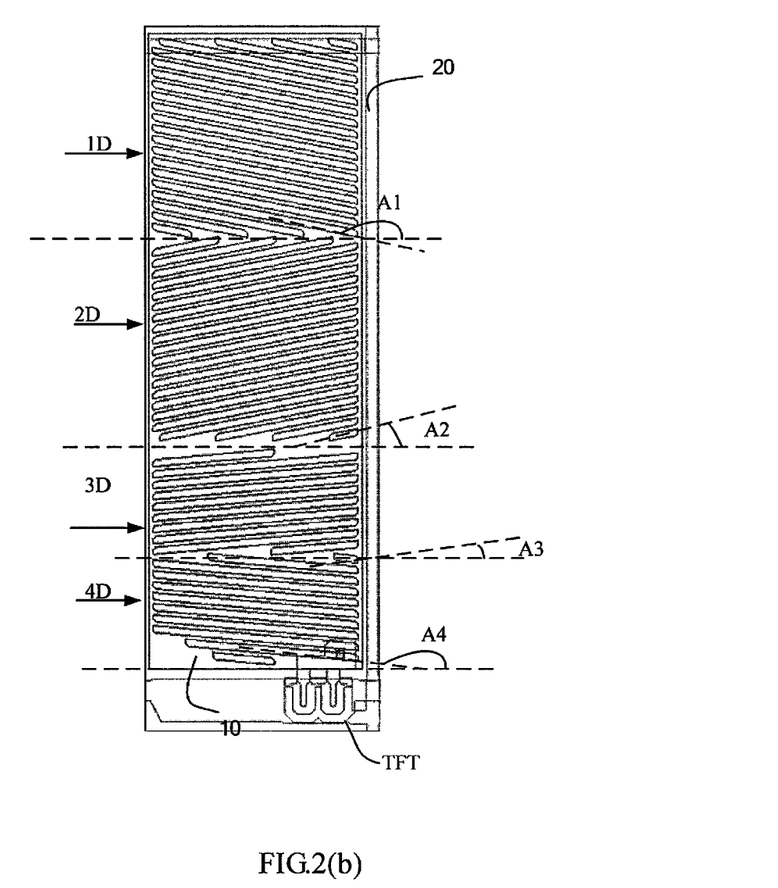
Figure 3:
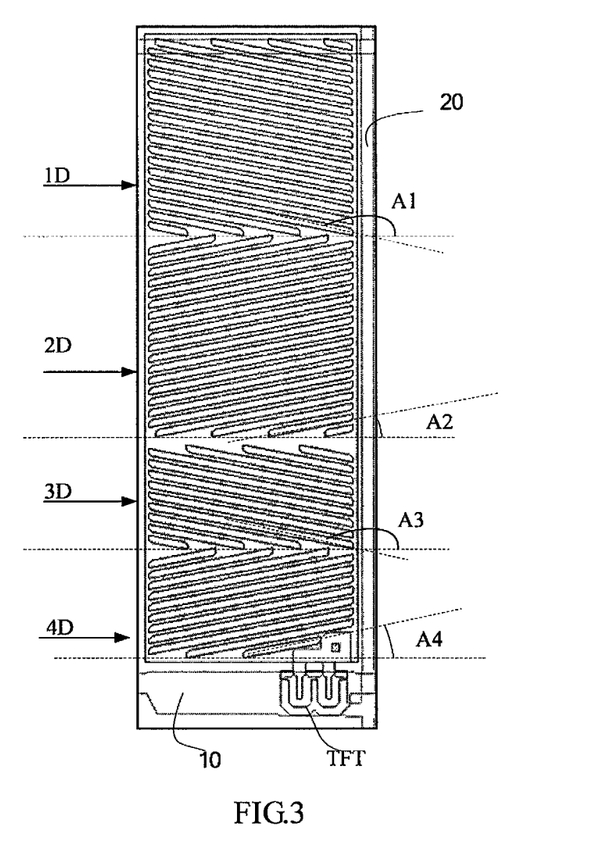
FIG. 3 is a structural schematic view of a further pixel structure provided in an embodiment of the present technical disclosure.

For example, as shown in FIG. 2 (a), the first angle A1 is 169 degrees, accordingly the second angle A2 is 11 degrees, the third angle A3 is 173 degrees, and the fourth angle A4 is 7 degrees. For example, as shown in FIG. 2 (b), the first angle A1 is 169 degrees, accordingly the second angle A2 is 11 degrees, the third angle A3 is 7 degrees, and the fourth angle A4 is 173 degrees. For example, as shown in FIG. 3, the first angle A1 is 169 degrees, accordingly the second angle A2 is 11 degrees, the third angle A3 is 169 degrees, and the fourth angle A4 is 11 degrees.

For example, preferably, an absolute value of the difference between the first angle A1 and the third angle A3 is greater than zero degree and less than or equal to 6 degrees, or the sum of the first angle A1 and the third angle A3 is greater than or equal to 174 degrees and less than or equal to 186 degrees. With such arrangement, the rubbing treatment of the liquid crystal panel may be completed in one time so that there is no need to perform rubbing treatment in different regions respectively; the driving voltage over the liquid crystal panel has slight difference so as to prevent the great difference in threshold voltage and saturation voltage brought by two angles that are greatly different from each other; the liquid crystals at borders between different regions are aligned in a similar way so as to prevent line defect.

For example, preferably, the first domain display region 1D, the second domain display region 2D, the third domain display region 3D and the fourth domain display region 4D are sequentially aligned in a vertical direction in the pixel region.

For example, preferably, the area of the first domain display region 1D is the same as that of the second domain display region 2D; and the area of the third domain display region 3D is the same as that of the fourth domain display region 4D.

Figure 4:
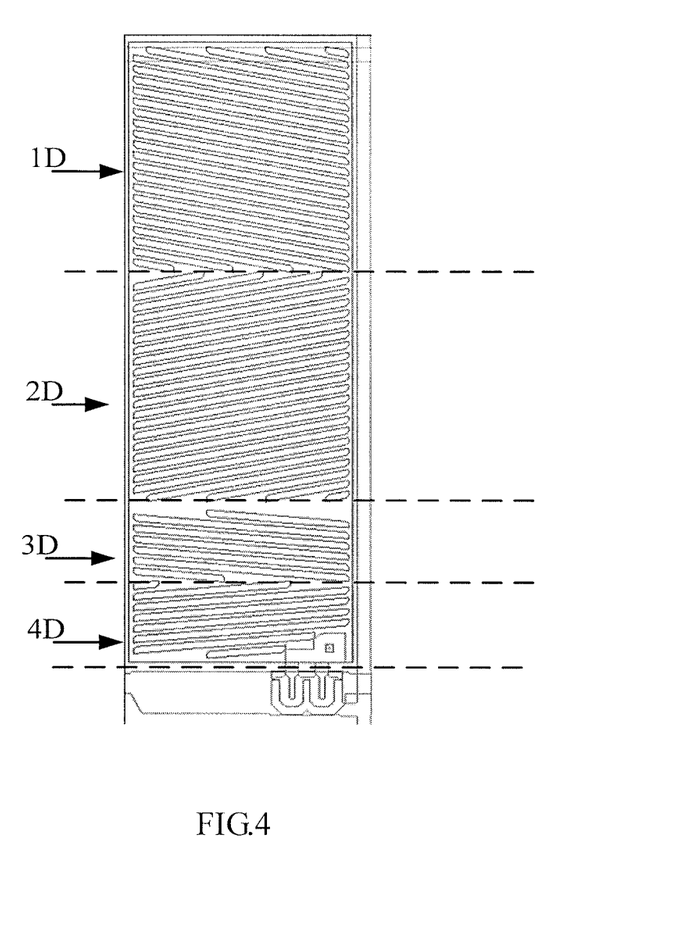
FIG. 4 is a structural schematic view of a further pixel structure provided in an embodiment of the present technical disclosure.

For example, preferably, a ratio of the area of the third domain display region 3D or the fourth domain display region 4D to the area of the first domain display region 1D or the second domain display region 2D is greater than or equal to 1:5 and less than or equal to 1:1. For example, in the pixel structure shown in FIG. 2 (a) and FIG. 2 (b), the ratio of the area of the third domain display region 3D or the fourth domain display region 4D to the area of the first or second domain display region is 1:2. Or, as shown in FIG. 4, the ratio of the area of the third domain display region 3D or the fourth domain display region 4D to the area of the first domain display region 1D or the second domain display region 2D is 1:3.

More specifically, as shown in FIG. 2 (a), the pixel structure provided in the present embodiment comprises a plurality of pixel regions, each of the pixel regions including a first domain display region 1D, a second domain display region 2D, a third domain display region 3D and a fourth domain display region 4D.

In the present embodiment, the horizontal-right direction is taken as the reference direction. In FIG. 2 (a), a strip-shaped pixel electrode in the first domain display region forms a first angle A1 of 169 degrees with the reference direction; a strip-shaped pixel electrode in the second domain display region forms a second angle A2 of 11 degrees with the reference direction; a strip-shaped pixel electrode in the third domain display region forms a third angle A3 of 173 degrees with the reference direction; a strip-shaped pixel electrode in the fourth domain display region forms a fourth angle A4 of 7 degrees with the reference direction; and the sum of the first angle and the second angle is 180 degrees, the sum of the third angle and the fourth angle is 180 degrees, and the first angle, the second angle, the third angle and the fourth angle are different from one another.

The first domain display region 1D, the second domain display region 2D, the third domain display region 3D and the fourth domain display region 4D are sequentially aligned in a vertical direction in the pixel region; the area of the first domain display region 1D is the same as that of the second domain display region 2D; the area of the third domain display region 3D is the same as that of the fourth domain display region 4D; the ratio of the area of the third domain display region 3D or the fourth domain display region 4D to the area of the first domain display region 1D or the second domain display region 2D is 1:2.

The present embodiment provides a TFT array substrate, which comprises any of the pixel structures provided in the aforementioned embodiments.

The array substrate of the present embodiment comprises a plurality of gate lines 10 and a plurality of data lines 20, the gate lines 10 and the data lines 20 intersecting each other to define pixel regions arranged in an array. Each of the pixel regions comprises a thin film transistor as a switch element, and a pixel electrode and a common electrode for controlling orientation of liquid crystal. For example, a gate electrode of the thin film transistor in each pixel is electrically connected to or integrally formed with a corresponding gate line, a source electrode thereof is electrically connected to or integrally formed with a corresponding data line, and a drain electrode thereof is electrically connected or integrally formed with a corresponding pixel electrode. The following description is mainly connected with one or more pixel regions, but other pixel regions can be formed similarly. The pixel regions adopt the aforementioned pixel structures.

The process of manufacturing the array substrate of the pixel structure in the present embodiment will be described herein, and it comprises the steps of manufacturing the following layers sequentially:

a gate layer, comprising a gate line and a gate electrode, for loading gate voltages so as to control the opening and closing of the switch element (TFT device) of the pixel unit;

a common electrode layer, which is usually a first transparent conductive layer (e.g., made of indium tin oxides (ITO)), for loading common electrode signals and forming storage capacitance together with a pixel electrode layer to drive liquid crystal to rotate;

a first passivation layer, for insulating the common electrode layer, the gate electrode, and an active layer so as to prevent short circuit;

an active layer, for forming channel portion of the TFT after performing the channel etching;

a data line layer, comprising a data line, a source electrode and a drain electrode, for load data signals for each pixel unit;

a second passivation layer, for insulating the data line and the pixel electrode layer;

a planar protective layer, which may be a layer of resin high molecular material, for reducing steps on the surface of the array substrate and achieving smooth transition of the surface of the array substrate, and which may not be included in another example; and a pixel electrode layer, comprising a pixel electrode for loading grey scale signals required for display. The pixel electrode herein is of the aforementioned pixel structure including four domains as described above and is different from the traditional pixel structures of a single domain or double domains.

In the aforementioned pixel structure, the common electrode is located below the pixel electrode and may be plate-shaped electrode or a slit electrode, to which common voltage is applied.

A liquid crystal material is filled between the array substrate with the aforesaid pixel structure and an opposed substrate (e.g., a color filter substrate), which are disposed opposite to each other so as to form a liquid crystal cell, thus a liquid crystal display panel comprising said pixel structure is manufactured.

In the process of driving the aforementioned liquid crystal display panel, the pixel electrodes in the first domain display region 1D, the second domain display region 2D, the third domain display region 3D and the fourth domain display region 4D of the pixel electrode structure are controlled by driving signals received by a same TFT as the switch element of the corresponding pixel unit. Referring to FIG. 5 (a)-FIG. 5 (d), the working principle is described as follows.

Figure 5A:
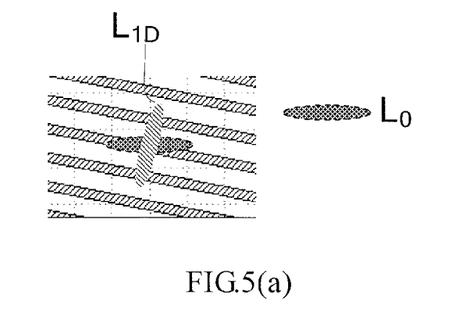
Figure 5B:
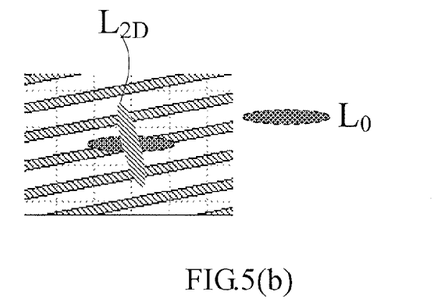
Figure 5C:
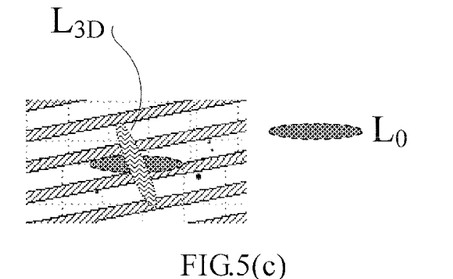
Figure 5D:
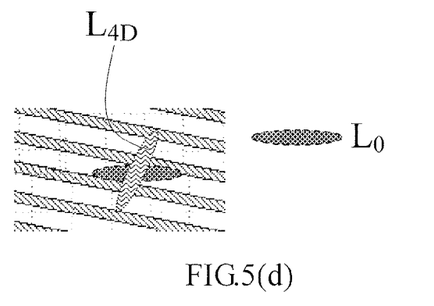

It is assumed that all liquid crystal molecules have an initial orientation of 0°, i.e., are aligned in the reference direction. $L_0$ in FIG. 5(a) shows the initial orientation of the liquid crystal molecules, and the diagonal pattern in the background represents the electrode. After the data voltage is applied, the pixel electrodes in different regions have different electrode directions, thus producing electric field lines in different directions such that the liquid crystal molecules are finally aligned in a direction perpendicular to the electrodes. All liquid crystal molecules are applied with the same voltage and electric field. As shown in FIG. 2 (a), the driving voltage is introduced to the pixel electrodes by the same TFT, and because the domain display regions share a same common electrode voltage, the liquid crystal molecules in the same pixel region are applied with the same voltage, whereby the distributions of electric field lines are the same as well. Then, after the voltage is applied, the liquid crystal molecules in the first domain display region 1D rotate by an angle of θ, shown as $L_{1D}$ in FIG. 5 (a), and the liquid crystal molecules in the second domain display region 2D rotate by an angle of 180-θ, shown as $L_{2D}$ in FIG. 5 (b). For the liquid crystal molecules in the third domain display region 3D, since the angle between the electrode and the horizontal direction in the region 3D is different from the angles between the electrodes in the regions 1D and 2D and the horizontal direction, the liquid crystal molecules in region 3D in the working condition rotate by an angle of φ, shown as $L_{3D}$ in FIG. 5 (c), and the liquid crystal molecules in the fourth domain display region 4D rotate by an angle of 180-φ, shown as $L_{4D}$ in FIG. 5 (d).

At the same time, the relationship of the angles between the strip-like pixel electrode in the domain display regions 1D/2D and in the domain display regions 3D/4D and the reference direction is: an absolute value of the difference between the first angle and the third angle is greater than zero degree and less than or equal to 6 degrees, or the sum of the first angle and the third angle is greater than or equal to 174 degrees and less than or equal to 186 degrees. So, in the working condition, the relation between the rotation angles of the liquid crystal molecules in the domain display regions 1D/2D and those in the domain display regions 3D/4D is: $\theta - \phi \leq 6°$.

The rotation angles of the liquid crystal molecules in said different regions are shown in the following table:

TABLE 1

| Domain display region | 1D | 2D | 3D | 4D |
|---|---|---|---|---|
| Schematic view of rotation of liquid crystal molecules | FIG. 5 (a) | FIG. 5 (b) | FIG. 5 (c) | FIG. 5 (d) |
| Rotation angle | θ | 180-θ | φ | 180-φ |

Note
Liquid crystal molecules corresponding to all domains have the same material.

When there are only domain display regions 1D/2D in one pixel unit, the molecular conditions of liquid crystal in the pixel units of the two domains are shown as $L_{1D}$, $L_{2D}$ in FIG. 5 (a) and FIG. 5 (b), and the retardation (dΔn) of liquid crystal in different directions may change along with the viewing angles of human eyes. The dΔn is related to the variables a, θ, $n_e$, and $n_o$ shown in the FIG. 6.

Figure 6:
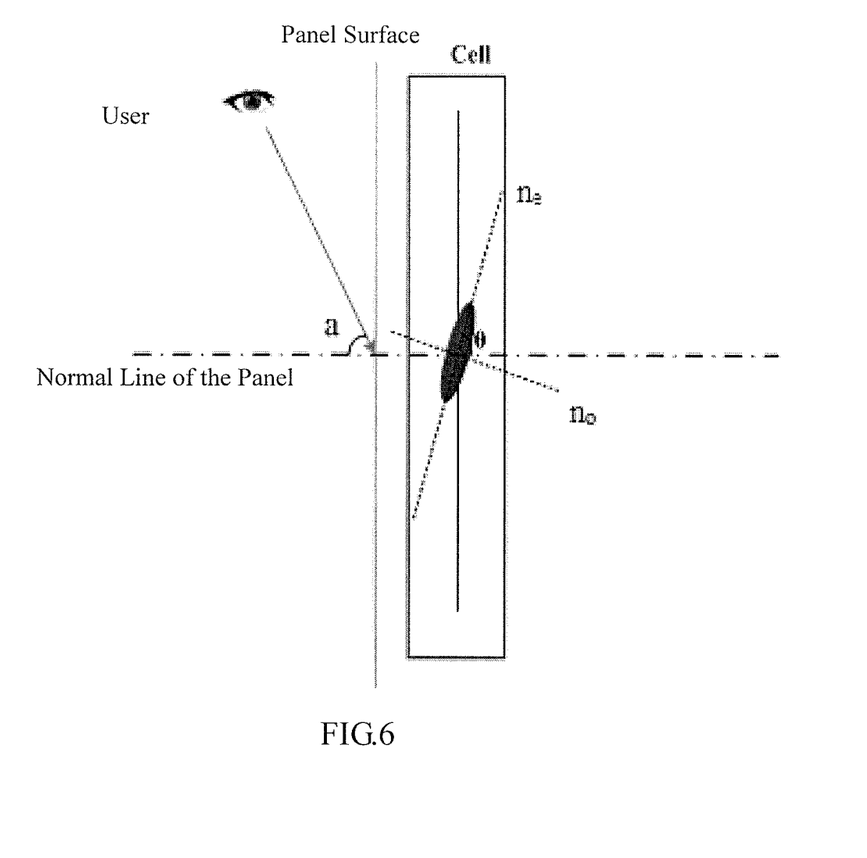
FIG. 6 is an analytical schematic view of the angle of human eyes observing the liquid crystal display panel.

In FIG. 6, "cell" represents the panel after cell-assembling; "a" represents the angle between an eye and the normal line of the panel; "θ" represents the angle between the liquid crystal molecule and the normal line of the panel; "$n_e$" represents the refractivity for ordinary light of the liquid crystal molecule; and "$n_o$" represents the refractivity for non-ordinary light of the liquid crystal molecule.

When there are four domain display regions 1D/2D and 3D/4D in one pixel units, the molecular conditions of liquid crystal in each pixel unit are shown as $L_{1D}$, $L_{2D}$, $L_{3D}$, $L_{4D}$ in FIG. 5 (a), FIG. 5 (b), FIG. 5 (c) and FIG. 5 (d) respectively. At this time, the change in retardation (dΔn) of liquid crystal in different directions along with the viewing angles of human eyes will be notably reduced, and, under some gray scales, the values of retardation with different angles become close to each other, thus to eliminate chromatic aberration.

Further, a simulation display of the optical performance of the pixel structure of the liquid crystal display panel provided by the present embodiment is carried out, with the simulation result being explained herein. The simulation experiment studies four kinds pixel structures, i.e., the traditional two-domain pixel structure as shown in FIG. 1, the four-domain pixel structure as shown in FIG. 3 in the embodiment, the four-domain pixel structure as shown in FIG. 2 (a) in the embodiment, and the four-domain pixel structure as shown in FIG. 2 (b) in the embodiment. The following Table 2 is referred to for details.

TABLE 2

|  | Two domains (2 Domain) | Four domains (4 Domain) | Four domains (Improve1) | Four domains (Improve2) |
|---|---|---|---|---|
| Structure | See FIG. 1 | See FIG. 3 | See FIG. 2 (a) | See FIG. 2 (b) |
| 1D, | A1: 169° | A1: 169° | A1: 169° | A1: 169° |
| 2D | A2: 11° | A2: 11° | A2: 11° | A2: 11° |
| 3D, | NA | A3: 169° | A3: 173° | A3: 7° |
| 4D |  | A4: 11° | A4: 7° | A4: 173° |

Figure 7:
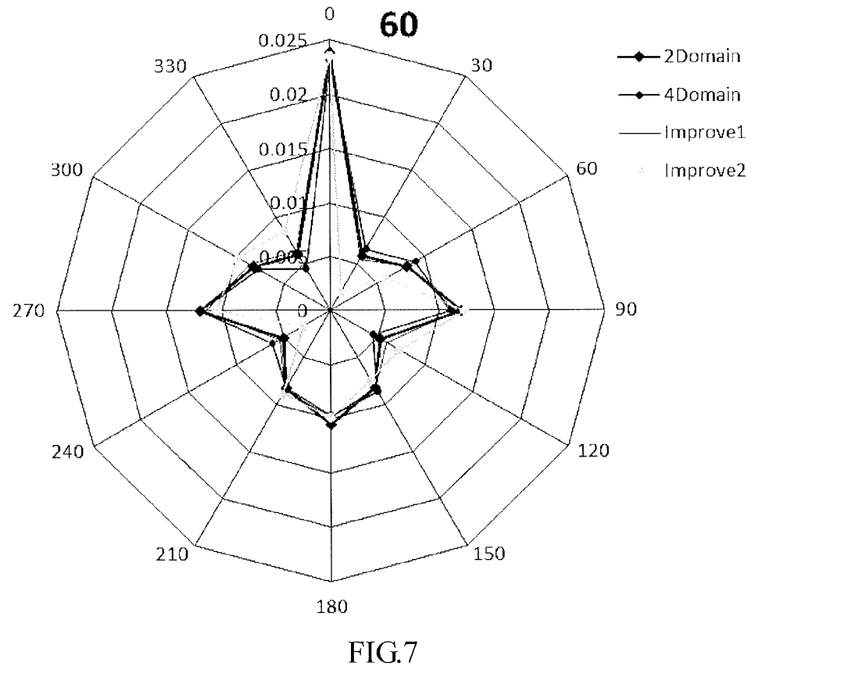
FIG. 7 is a schematic view showing a simulation result of the optical performances of the liquid crystal display panel adopting the pixel structure of FIG. 1, FIG. 2 (a), FIG. 2 (b) and FIG. 3.
Figure 8:
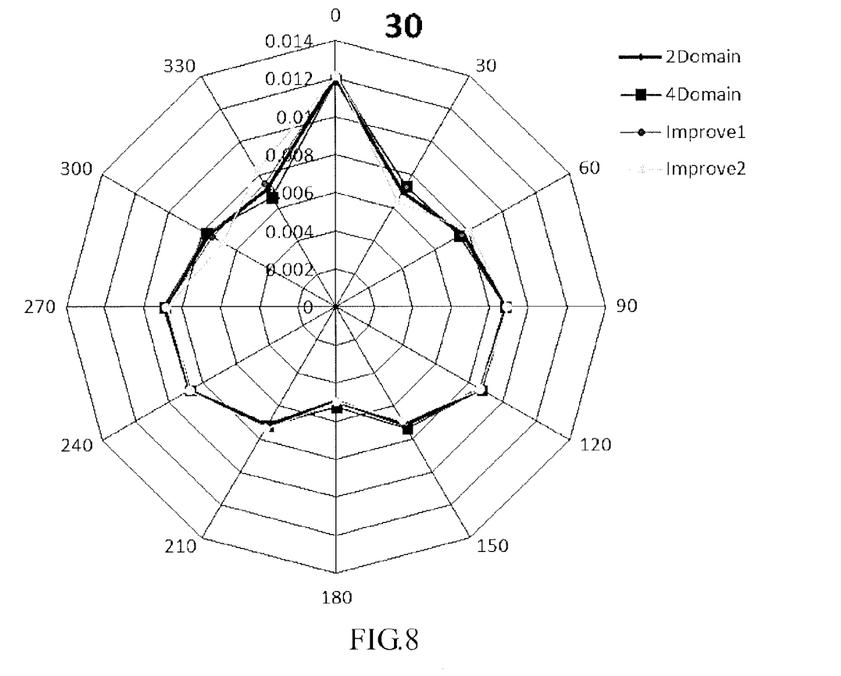
FIG. 8 is a schematic view showing another simulation result of the optical performances of the liquid crystal display panel adopting the pixel structure of FIG. 1, FIG. 2 (a), FIG. 2 (b) and FIG. 3.

The simulation results are shown in FIGS. 7 and 8. FIG. 7 and FIG. 8 respectively show the chromatic aberration when the angles between the human eye viewing direction and the normal line direction (i.e., vertically viewing direction) are 60° and 30°. Each figure includes the chromatic aberration simulations results of the four kinds of pixel structures, whose graphic symbols are shown at the top left corner of the figure. Seen from the simulation figure in which the angle between the human eye viewing direction and the normal line is 60°, the four-domain structure corresponding to FIG. 2 (b) can notably reduce the chromatic aberration in different directions, especially, in the direction of angle of 45°. Seen from the simulation figure in which the angle is 30°, the four-domain structure corresponding to FIG. 2 (b) can also notably reduce the chromatic aberration in different directions. It can be seen from the comparison of area between the simulation results that the effect of improvement is obvious.

The liquid crystal display device according to the present embodiment comprises an array substrate and an opposed substrate, which are disposed opposite to each other so as to form a liquid crystal cell, and the liquid crystal cell is filled with a liquid crystal material. The opposed substrate is, for example, a color filter substrate. When the array substrate comprises a color filter structure, there is no need to provide a color filter substrate on the opposed substrate. In some examples, the liquid crystal display device further comprises a backlight for providing light for the array substrate.

To sum up, the present embodiment includes the third and the fourth domain display regions in addition to the two-domain pixel regions of ADSDS technology. By adjusting the angle between the direction of the strip-shaped pixel electrode in each display region and the reference direction and by using a TFT to control the four domains in display to generate different liquid crystal deflection angles, the chromatic aberration can be corrected and the viewing angle can be improved. The technical solution of the embodiments of the disclosure corrects the chromatic aberration and improves the viewing angle while not reducing the transmittance, thus finally improving the image quality of the panel display.

The above description is done with an example that the pixel electrode is disposed above the common electrode in the pixel structure, but the present technical disclosure is not limited to this. In the pixel structure provided by another embodiment of the present technical disclosure, the pixel electrode is disposed below the common electrode, wherein the upper common electrode is formed as a slit electrode and comprises a plurality of strip sections, and the pixel electrode may be a plate-shaped electrode or a slit electrode. The common electrode is electrically connected to a common electrode line and is applied with a common voltage; the pixel electrode is electrically connected to, for example, a drain electrode of the TFT of corresponding pixel unit and thus is applied with a data voltage.

Also referring to FIG. 2 (a), each pixel region comprises a pixel electrode and a common electrode disposed above the pixel electrode, and each pixel region is divided into: a first domain display region 1D, a second domain display region 2D, a third domain display region 3D, and a fourth domain display region 4D. A strip-shaped common electrode in the first domain display region 1D forms a first angle A1 with a reference direction, a strip-shaped common electrode in the second domain display region 2D forms a second angle A2 with the reference direction, a strip-shaped common electrode in the third domain display region 3D forms a third angle A3 with the reference direction, and a strip-shaped common electrode in the fourth domain display region 4D forms a fourth angle A4 with the reference direction.

The settings of the angles A1-A4 may be selected the same as the pixel electrode in the aforementioned embodiment and no more details are given herein. Also as shown in FIG. 2 (a), the driving voltage is introduced to the pixel electrodes by the same TFT. Since the domain display regions 1D-4D share a same pixel electrode voltage, the liquid crystal molecules in the same pixel region are applied with the same voltage, whereby the distributions of electric field lines are the same. Then, after the voltage is applied, the liquid crystal molecules in the first domain display region 1D rotate by an angle of θ, shown as $L_{1D}$ in FIG. 5 (a), and the liquid crystal molecules in the second domain display region 2D rotate by an angle of 180-θ, shown as $L_{2D}$ in FIG. 5 (b). For the liquid crystal molecules in the third domain display region 3D, since the angle between the electrode and the horizontal direction in the region 3D is different from the angle between the electrode in the 1D and 2D and the horizontal direction, the liquid crystal molecules in the region 3D in the working condition rotate by an angle of φ, shown as $L_{3D}$ in FIG. 5 (c), and the liquid crystal molecules in the fourth domain display region 4D rotate by an angle of 180-φ, shown as $L_{4D}$ in FIG. 5 (d). As a result, the present embodiment can achieve the same technical effect as the aforementioned embodiment.

A pixel electrode and a common electrode can be collectively called "a liquid crystal driving electrode" or "driving electrode." They are overlapped in the direction perpendicular to the substrate and cooperate with each other to form a liquid crystal driving electric field for display.

The above embodiments of the present technical disclosure are given by way of illustration only and thus are not limitative of the protection scope of the present technical disclosure, which is determined by the attached claims.

What is claimed is that:

1. A pixel structure, comprising a plurality of pixel regions, wherein each of the pixel regions includes a first electrode and a second electrode that are overlapped with each other, the first electrode is disposed above the second electrode, and each of the pixel regions is divided at least into: a first domain display region, a second domain display region, a third domain display region, and a fourth domain display region;

a strip-shaped first electrode in the first domain display region forms a first angle with a reference direction, a strip-shaped first electrode in the second domain display region forms a second angle with the reference direction, a strip-shaped first electrode in the third domain display region forms a third angle with the reference direction, and a strip-shaped first electrode in the fourth domain display region forms a fourth angle with the reference direction;

the sum of the first angle and the second angle is 180 degrees, the sum of the third angle and the fourth angle is 180 degrees, and the first, the second, the third and the fourth angles are different from one another.

2. The pixel structure according to claim 1, wherein the first angle is greater than zero degree and less than or equal to 11 degrees, or is greater than or equal to 169 degrees and less than 180 degrees.

3. The pixel structure according to claim 1, wherein the third angle is greater than zero degree and less than or equal to 11 degrees, or is greater than or equal to 169 degrees and less than 180 degrees.

4. The pixel structure according to claim 2, wherein an absolute value of the difference between the first angle and the third angle is greater than zero degree and less than or equal to 6 degrees, or the sum of the first angle and the third angle is greater than or equal to 174 degrees and less than or equal to 186 degrees.

5. The pixel structure according to claim 3, wherein an absolute value of the difference between the first angle and the third angle is greater than zero degree and less than or equal to 6 degrees, or the sum of the first angle and the third angle is greater than or equal to 174 degrees and less than or equal to 186 degrees.

6. The pixel structure according to claim 1, wherein the first domain display region, the second domain display region, the third domain display region, and the fourth domain display region are sequentially aligned in a vertical direction in the pixel region.

7. The pixel structure according to claim 6, wherein the area of the first domain display region is the same as that of the second domain display region; and the area of the third domain display region is the same as that of the fourth domain display region.

8. The pixel structure according to claim 7, wherein a ratio of the area of the third or fourth domain display region to the area of the first or second domain display region is greater than or equal to 1:5 and less than or equal to 1:1.

9. The pixel structure according to claim 1, wherein the first electrode and the second electrode are respectively a pixel electrode and a common electrode, or the first electrode and the second electrode are respectively a common electrode and a pixel electrode.

10. An array substrate, comprising a pixel structure according to claim 1.

11. A liquid crystal display panel, comprising: an array substrate, an opposed substrate and liquid crystal materials, wherein the array substrate is the array substrate according to claim 9.

* * * * *